Figure 1:
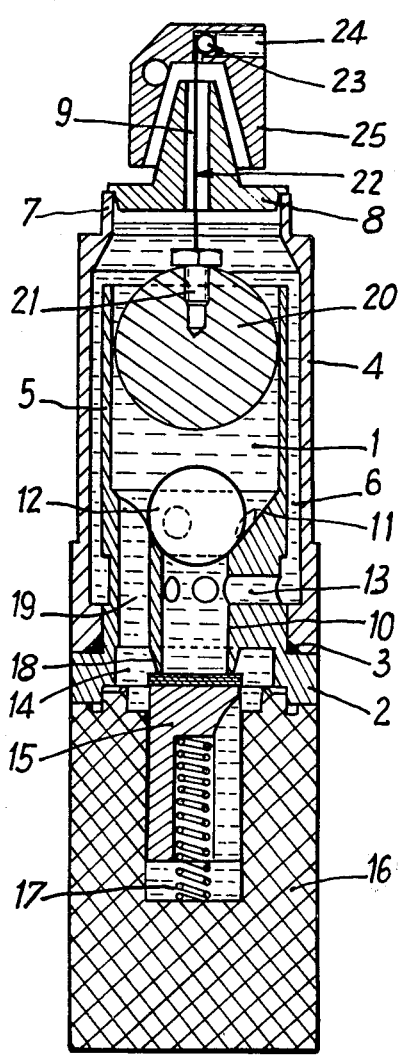

United States Patent [19]

Rouban

[11] 4,071,103
[45] Jan. 31, 1978

[54] AUXILIARY DYNAMIC COMPENSATION DEVICES FOR GRAVIMETRIC DISPENSERS

[75] Inventor: Basile Rouban, Clamart, France

[73] Assignee: Trayvou S.A., Vincennes, France

[21] Appl. No.: 776,779

[22] Filed: Mar. 11, 1977

[30] Foreign Application Priority Data

Mar. 16, 1976 France .................................. 76 07483

[51] Int. Cl.² ............................................. G01G 23/06
[52] U.S. Cl. ..................................................... 177/188
[58] Field of Search ................ 177/184, 187, 188, 207

[56] References Cited

U.S. PATENT DOCUMENTS

| | | | |
|---|---|---|---|
| 837,496 | 12/1906 | Osborne | 177/188 |
| 1,584,884 | 5/1926 | Merrick | 177/184 X |
| 2,383,404 | 8/1945 | Meeker et al. | 177/188 |
| 2,639,136 | 5/1953 | Van Duyn | 177/188 X |
| 3,677,356 | 7/1972 | Goodwin | 177/207 X |
| 3,985,190 | 10/1976 | Kammerer et al. | 177/184 |

FOREIGN PATENT DOCUMENTS

179,023  4/1962  Sweden .................................. 177/184

Primary Examiner—George H. Miller, Jr.
Attorney, Agent, or Firm—Staas & Halsey

[57] ABSTRACT

An auxiliary dynamic compensation device for a gravimetric dispenser, comprises a piston suspended by a pliant and non-extensible connection which is adapted for attachment to the beam or equivalent weighing member of the weighing device of the dispenser and is vertically movable with limited lateral clearance in a vessel containing a liquid in which the piston does not float. A bypass passage interconnects the interior of the vessel below the piston and the interior of the vessel above the piston and contains a non-return valve arranged so as to close the said passage if the piston begins to descend in the vessel and to open it if the piston begins to rise, whereby the piston can follow upward movements of the beam, but those downward movements thereof which are more rapid than those of the piston, are accompanied by a variation in the load applied by the pliant connection due to the retardation of the descent of the piston.

9 Claims, 2 Drawing Figures

AUXILIARY DYNAMIC COMPENSATION DEVICES FOR GRAVIMETRIC DISPENSERS

This invention relates to auxiliary dynamic compensation devices for gravimetric dispensers and has particular application to gravimetric dispensers which operate in two stages, i.e. a first stage, the "coarse" or "pre-dispensing" stage, during which the majority of the dosage to be dispensed is poured into the receptacle of the dispenser at a relatively high flow rate and a second stage, the "making-up" stage, during which the rest of the dosage is poured, at a slower flow rate than in the preceding stage, up to the point when the required dosage has been delivered.

Since the flow rate during the making-up stage is relatively slow, it is desirable for the quantity of the product poured during the coarse stage to differ as little as possible from the predetermined value because a large discrepancy entails an undesired prolongation of the making-up stage.

It is known that, when the weighing device or dosage sensor is near to balancing, the fall of the final material of the product into the receptacle thereof can give, momentarily, an apparent weight which is higher than the tare, because of the momentum of this falling material. This results in deficiencies in the determining of the coarse dosage, differences which are generally reduced by damping the oscillations of the weighing device.

The disadvantage of such damping is that it lengthens the time of response of the instrument and, consequently, reduces the accuracy thereof.

The present invention has the aim of providing a dynamic compensation device for a gravimetric dispenser of the above type which permits the limiting of the effects of the active force during the coarse stage of weighing.

According to the invention, there is provided an auxiliary dynamic compensation device for a gravimetric dispenser, comprising a piston suspended by a pliant and non-extensible connection which is adapted for attachment to the beam or equivalent weighing member of the weighing device of the dispenser and is vertically movable with limited lateral clearance in a vessel containing a liquid in which the piston does not float, a bypass passage interconnecting the interior of the vessel below the piston and the interior of the vessel above the piston and containing a non-return valve arranged so as to close the said passage if the piston begins to descend in the vessel and to open it if the piston begins to rise, whereby the piston can follow upward movements of the beam, but those downward movements thereof which are more rapid than those of the piston, are accompanied by a variation in the load applied by the pliant connection due to the retardation of the descent of the piston.

Such device has the advantage of responding without play to the movements of the beam to provide a momentary error signal which exists while the connection is not under stress and ceases as soon as the said connection comes under stress again. The piston can rise in the vessel without encountering great resistance but it can only descend slowly, thus ensuring an error signal as soon as the speed of descent of the beam exceeds that of the piston.

Means such as a second bypass passage supplied with a controlled valve, for example an electrically operated valve, may be provided to permit cancellation of the action of the non-return valve for the purpose of suppressing the error signal.

Figure 2:
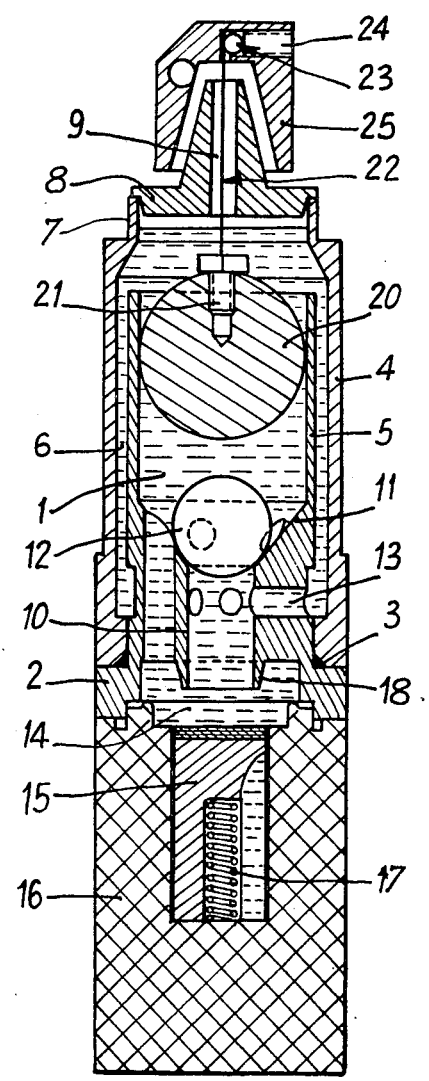

An embodiment of the invention will now be described by way of example, with reference to the accompanying drawings, in which:

FIG. 1 is a vertical sectional view of a compensation device according to the invention with the electrically operated valve closed, FIG. 2 is a view similar to that of FIG. 1 but with the electrically operated valve open.

In the embodiment shown in the drawing, the compensation device comprises a vessel 1, which is essentially formed of a collar 2 on to which is fitted a sleeve 4, with a seal 3 therebetween.

The collar 2 is extended upwardly by a cylindrical wall 5 which encloses an annular space 6 within the sleeve 4. The top of the sleeve 4 is in the form of a rim 7 into which fits a cover 8 having a vertical central hole 9.

The bottom of the collar 2 is pierced by a central vertical duct 10, the upper edge of which is connected to the wall 5 by a truncated conical surface 11. The upper end of the duct 10 is normally blocked by a ball valve 12, of greater diameter than the duct 10, which rests on the seating formed by the surface 11.

The middle part of the duct 10 is permanently connected to the annular space 6 by radial channels 13. The bottom of the duct 10 opens into a central chamber 14.

The chamber 14 contains an electrically operated valve 15 which can block off the lower end of the duct 10 and is located in a block 16 which is fixed and sealed beneath the collar 2. A spring 17 is provided to restore the electrically operated valve 15 to a closed position.

Around the seating 18 of the electrically operated valve 15, vertical channels 19 are provided in the bottom of the collar 2, which channels maintain the vessel 1 in constant communication with the chamber 14.

A ball 20 is situated in the vessel 1 so as to be able to run with slight clearance from the cylindrical walls 5 and serve as a piston. The ball 20 is suspended by means of a central screw 21 from a pliant and non-extensible wire 22 which is led through the hole 9 in the cover 8.

The wire 22 is attached, by a lead ball 23 and a tensioning screw 24, to a cap 25 intended to be attached to the beam or equivalent member of a gravimetric dispenser (not shown).

The vessel 1 is filled with a liquid such as oil, in which the balls 12 and 20 do not float.

The device which has just been described operates as follows.

Any upward movement of the beam is accompanied by a corresponding upward movement of the ball 20 which applies a suction action to the ball valve 12. This latter is lifted allowing the liquid displaced by the ball 20 to circulate in the annular space 6, the radial channels 13 and the central duct 10. The ball 20 acts on the beam in the manner of a weight the value of which is equal to the difference between the weight of the ball 20 and the buoyancy (Archimedean) which the said ball undergoes in the vessel 1.

When the beam descends during the coarse stage, the electrically operated valve 15 is closed as shown in FIG. 1. The ball valve 12 closes, blocking off the duct 10 so that the liquid situated under the ball 20 can only escape slowly and, consequently, the movement of the ball 20 is damped. If the beam descends faster than the ball 20, the pliant wire 22 slackens and the load applied to the beam is reduced, compensating for the effects of the momentum of falling material.

On the other hand, when the beam descends during the making-up stage, the electrically operated valve 15 is open as shown in FIG. 2. The liquid situated below the ball 20 can now pass through the channels 19 into the chamber 14 and from there re-ascend through the duct 10, the radial channels 13 and the annular space 6. The ball can thus follow downward movements of the beam without appreciable damping. Thus there is no error signal.

It goes without saying that the embodiment illustrated in the drawings is only one example and that it could be modified, notably by the substitution of equivalent techniques, without departing from the invention as claimed in the following claims.

I claim:

1. An auxiliary dynamic compensation device for a gravimetric dispenser, comprising a piston suspended by a pliant and non-extensible connection which is adapted for attachment to the beam or equivalent weighing member of the weighing device of the dispenser and is vertically movable with limited lateral clearance in a vessel containing a liquid in which the piston does not float, a bypass passage interconnecting the interior of the vessel below the piston and the interior of the vessel above the piston and containing a non-return valve arranged so as to close the said passage if the piston begins to descend in the vessel and to open it if the piston begins to rise, whereby the piston can follow upward movements of the beam, but those downward movements thereof which are more rapid than those of the piston, are accompanied by a variation in the load applied by the pliant connection due to the retardation of the descent of the piston.

2. A device according to claim 1, wherein the piston is a ball and the vessel is cylindrical.

3. A device according to claim 1, wherein cancelling means are provided for cancelling the effect of the non-return valve in order to suppress the retardation of the descent of the piston.

4. A device according to claim 3, wherein the cancelling means comprise a second bypass passage which bypasses the retaining valve and contains a controlled valve.

5. A device according to claim 4, wherein the controlled valve is an electrically operated valve.

6. A device according to claim 4, wherein the bypass passages comprise a duct formed in the bottom of the vessel and so arranged that its upper end can be blocked by the non-return valve and its lower end can be blocked by the controlled valve, the interior of the vessel above the piston being connected to the duct between the non-return valve and the controlled valve, the latter valve being located in a chamber which is connected to the vessel above the non-return valve.

7. A device according to claim 6, wherein the vessel, the duct and the chamber containing the controlled valve are coaxial.

8. A device according to claim 6, wherein the bottom surface of the vessel is in the shape of a truncated cone leading to the duct and the non-return valve comprises a ball with a larger diameter than that of the duct, the said bottom surface forming the valve seating, the duct being connected to the interior of the vessel above the piston by means of radial channels and the chamber containing the controlled valve being connected to the interior of the vessel below the piston by channels which enter the vessel above the seating of the ball.

9. A device according to claim 8, wherein the vessel is surrounded by an annular space into which lead radial channels for communication with the interior of the vessel above the piston.

* * * * *